United States Patent [19]

Groeing

[11] Patent Number: 4,595,210
[45] Date of Patent: Jun. 17, 1986

[54] FRUIT BIN TRAILER

[76] Inventor: Robert E. Groeing, 201 S. 88th Ave., Yakima, Wash. 98902

[21] Appl. No.: 700,284

[22] Filed: Feb. 11, 1985

[51] Int. Cl.⁴ ................................................. B60P 1/18
[52] U.S. Cl. ............................... 280/43.23; 280/414.5; 298/23 B; 414/474; 414/491
[58] Field of Search .................. 280/414.5, 656, 43.12, 280/43.17, 43.22, 43.23; 414/474, 476, 491; 298/23 A, 23 B, 23 D, 23 S, 23 M, 23 MD

[56]  References Cited
U.S. PATENT DOCUMENTS

| | | | |
|---|---|---|---|
| 1,628,871 | 5/1927 | Bruce | 414/491 |
| 3,012,682 | 12/1961 | Williamson . | |
| 3,335,887 | 8/1967 | Snook | 414/476 |
| 3,410,569 | 11/1968 | Blake | 280/43.23 |
| 3,633,775 | 1/1972 | Pugliese . | |
| 3,635,492 | 1/1972 | Mauldin . | |
| 3,780,894 | 12/1973 | Holmes | 298/23 A |
| 4,081,094 | 3/1978 | Pereira | 414/491 |
| 4,290,733 | 9/1981 | Lahman . | |

Primary Examiner—John J. Love
Assistant Examiner—Joseph McCarthy
Attorney, Agent, or Firm—Dowrey & Cross

[57] ABSTRACT

The invention is a trailer suitable for hauling fruit bins or the like, pivotally connected to a hitch and supported by an axle assembly which includes an offset cross shaft. An hydraulically actuated cam assembly rotates the cross shaft so that the rear end of the trailer can be lowered to the ground for easy loading and unloading without raising the forward end. The trailer also has a stop mechanism on its rear end which is actuated by the same cam assembly which rotates the axle, so as to automatically place it in operative position when the trailer is raised.

8 Claims, 8 Drawing Figures

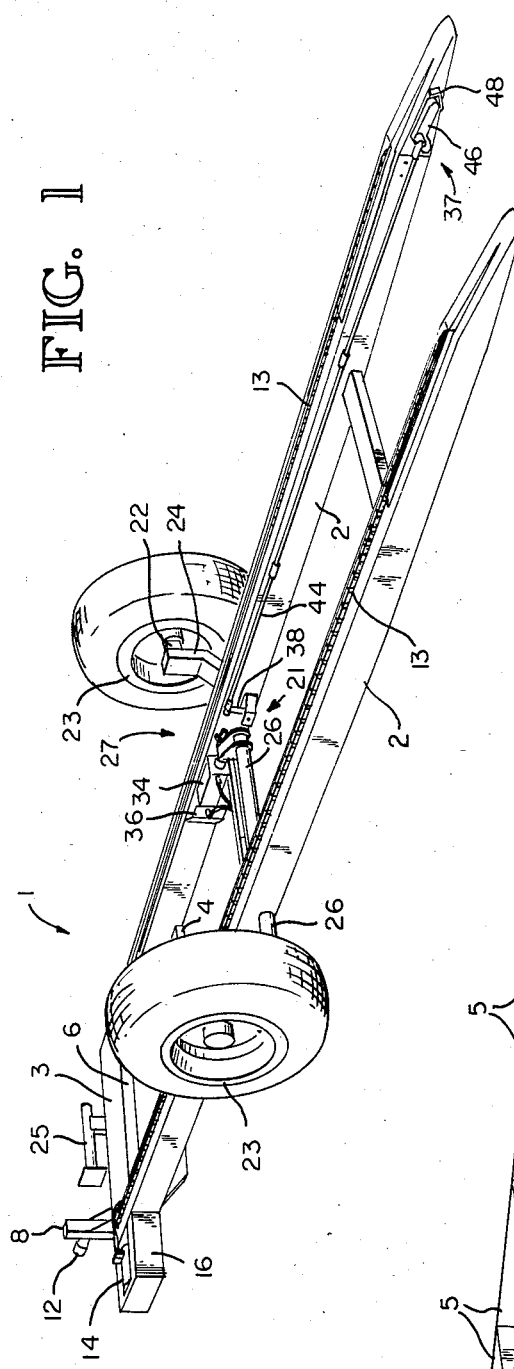
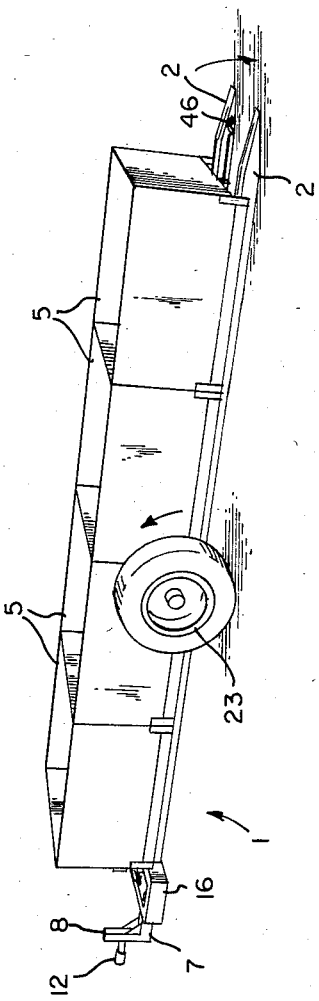
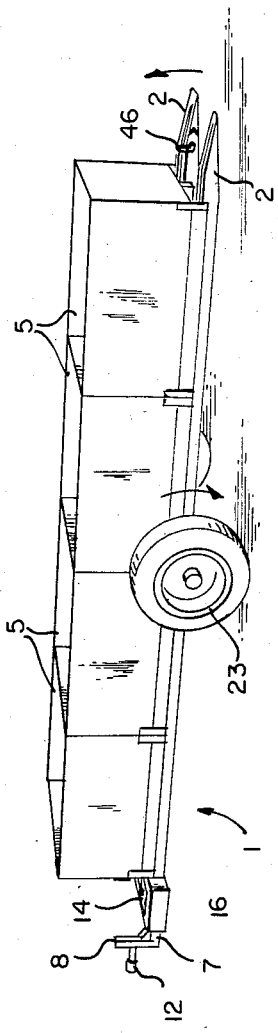

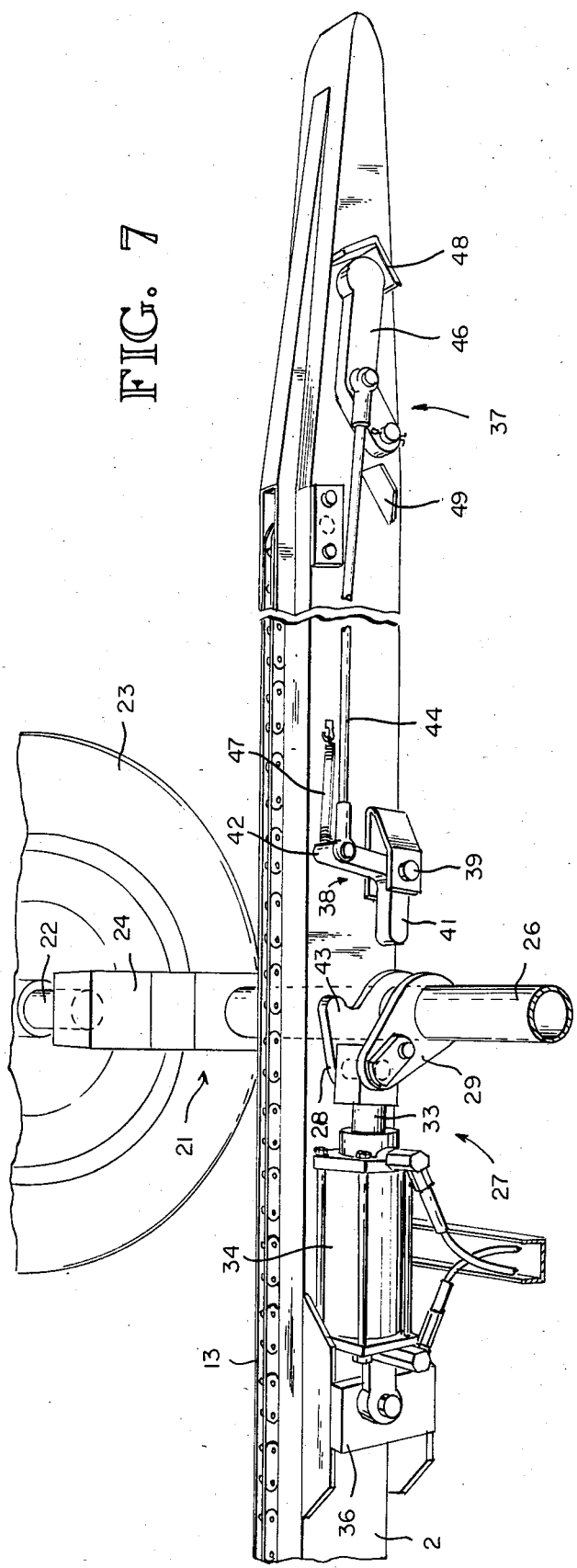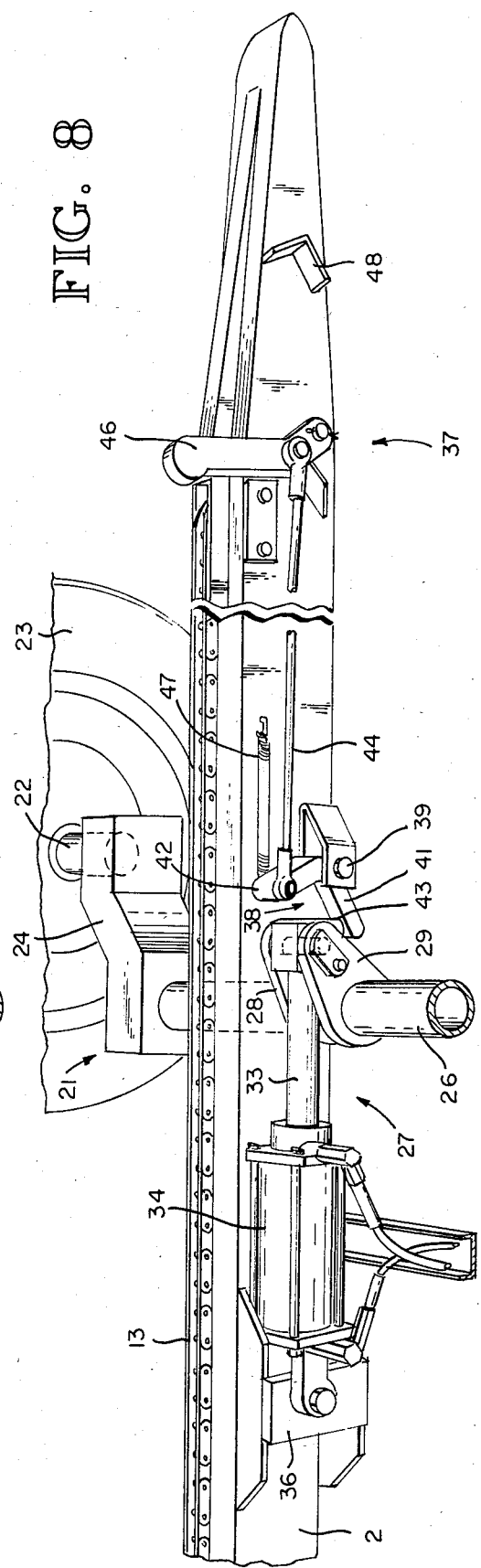

FRUIT BIN TRAILER

FIELD OF THE INVENTION

This invention relates to trailers for hauling cartons, bins or the like, and more specifically to trailers for hauling fruit bins.

BACKGROUND OF THE INVENTION

When fruit is harvested in an orchard, it is commonly placed in rectangular bins which are then loaded onto a trailer specifically designed for carrying such bins. A typical prior art fruit bin trailer has a pair of support rails which are joined by a crossbar at the front end and which usually have an upright stop at the front end to prevent the bins which rest on the rails from falling forward off the trailer. A tongue extends forward from the trailer to a tractor hitch which, together with a wheel-bearing axle near the midpoint of the rails support the rails several inches off the ground.

For ease of loading and unloading, the trailer is typically tilted into a position where the back end of the rails contact the ground. This allows the bins to slide from the ground onto the rails, or vice versa. Endless conveyor chains along the length of each rail driven by a hydraulic motor assist in the sliding of bins up onto or down off the rails.

The lowering of the back end of the rails in a typical prior art fruit bin trailer is accomplished by pivoting the trailer about its axle with a vertical hydraulic cylinder mounted between the front stop and the tongue, which is pivotally connected to the underside of the trailer for this purpose. While this arrangement does lower the rear of the trailer as desired, it also raises the front end. This is undesirable since the incline of the rails is as a result quite steep. Since fruit-filled bins are both bulky and heavy, a steep incline makes a difficult job still more difficult.

Another disadvantage of the pivoting prior art trailer is that the bins on the raised front end of the trailer may be unable to clear low branches. Maneuvering the trailer to avoid the low branches may be time-consuming or impossible, but not doing so will damage the branches, and possibly the trailer.

Still another disadvantage of prior art trailers is that bins can easily fall off the back end of a trailer. Because the back ends of the rails are flat, so as to present no resistance to the normal loading and unloading of bins, they do not prevent accidental unloading. Bins are free to slide backward off the rails while the back ends of the rails are raised off the ground. Since trailers frequently travel over rough ground and unpaved surfaces in fields and orchards, the kind of jarring, bumpy ride which would lead to bins falling rearwardly off the trailer is a common occurrence.

A need has thus arisen for a trailer which is easily loaded and unloaded, which does not interfere with low branches in an orchard or other elements of its surrounding environment, and which holds its load securely so that the load does not slide off the rails during transport.

SUMMARY OF THE INVENTION

The present invention provides a trailer suitable for hauling fruit bins or the like, with a rear end which can be lowered to the ground for easy loading and unloading without elevating the front end. In addition, the present invention provides a stop mechanism on the rear end of the trailer which is automatically placed in its operative position when the trailer is raised.

A trailer according to a preferred embodiment of the invention includes a load support bed connected at one end to a ground support means which supports that end above ground level. A second ground support means raises and lowers the second end of the bed to move the bed between a generally horizontal raised position and a tilted lowered position. An actuator associated with the second ground support means moves a load restraining means between a released position, where it lies below the surface of the bed and does not interfere with movement of a load, and a load restraining position, where it extends above the surface of the bed to block movement of the load. Movement of the load restraining means occurs in response to movement of the bed, so that the load restraining means is moved into the load restraining position when the bed is moved into a raised position.

The trailer of the present invention includes a pair of rails joined at their forward ends by a crossbar to form a bed, or load support surface. Endless conveyor chains driven by a hydraulic motor are provided along the tops of the rails to aid in moving loads across the rails. A tongue extending forwardly from the trailer is pivotally coupled to an upright mounted to a trailer hitch. Ground support wheels are carried by an axle assembly which includes a cross shaft extending between and rotatably mounted in the rails. The cross shaft is connected to the wheel trunions or stub axles by radial arms such that the shaft forms an offset axis with respect to the wheel axes. An hydraulic cylinder is mounted along the inside of each rail to actuate a radially extending cam plate assembly fixed to each end of the cross shaft to rotate the shaft. Due to the offset relationship between the shaft and the wheel axles, the shaft is raised or lowered with respect to ground level upon rotation. Since the rails, comprising the trailer bed, are connected to the cross shaft and supported at the forward end of the trailer hitch, the bed is moved between a substantially horizontal position and a tilt position wherein the rear ends of the rails are in proximity to the ground. The rear ends of the rails can thus be lowered to the ground, with the trailer bed pivoting about a point near the hitch. Since the pivot point or hitch point is forward of the front ends of the rails, no part of the trailer bed is raised by the pivoting operation. In fact, the entire trailer from the hitch to the rearwardmost end is lowered, providing the most gentle incline possible to facilitate loading and to avoid interference with low-lying branches by the bins on the forward end of the trailer.

The present invention not only eliminates the problems caused by elevating the forward end of the trailer, but also provides means for simultaneous activation of stop mechanisms for securing a load on the rails automatically as the rails are raised after being loaded. The radially extending cam plate assemblies used to rotate the cross shaft also actuate lever arms which are connected to raise load restraining stop blocks on the ends of the rails. The cam plates lock the levers in position as long as the trailer bed is raised. Thus, each of the blocks is automatically raised and positively locked in securing position when the rear end of the trailer is raised, assuring that bins are securely held on the rails. When the rear end of the trailer is lowered, the cam plates move out of contact with the levers, which are springbiased to move the blocks to the lowered position. This assures that the blocks will not interfere with unloading. The present invention thus offers a unique stop block mechanism which operates without user effort and without interference with the loading or unloading of the trailer.

BRIEF DESCRIPTION OF THE DRAWINGS

FIG. 1 is a perspective view of a preferred embodiment of the trailer of the present invention with its rear end lowered for loading;

FIG. 2 is a perspective view of the FIG. 1 embodiment in the loaded condition prior to raising;

FIG. 3 is a perspective view of the FIG. 1 embodiment in the loaded and raised position;

FIG. 7 is a perspective view showing the offset shaft, cam plate assembly, and stop block mechanisms in the lowered position; and FIG. 8 is a perspective view showing the offset shaft, cam plate assembly, and stop block mechanisms in the raised position.

DETAILED DESCRIPTION OF A PREFERRED EMBODIMENT

Figure 4:
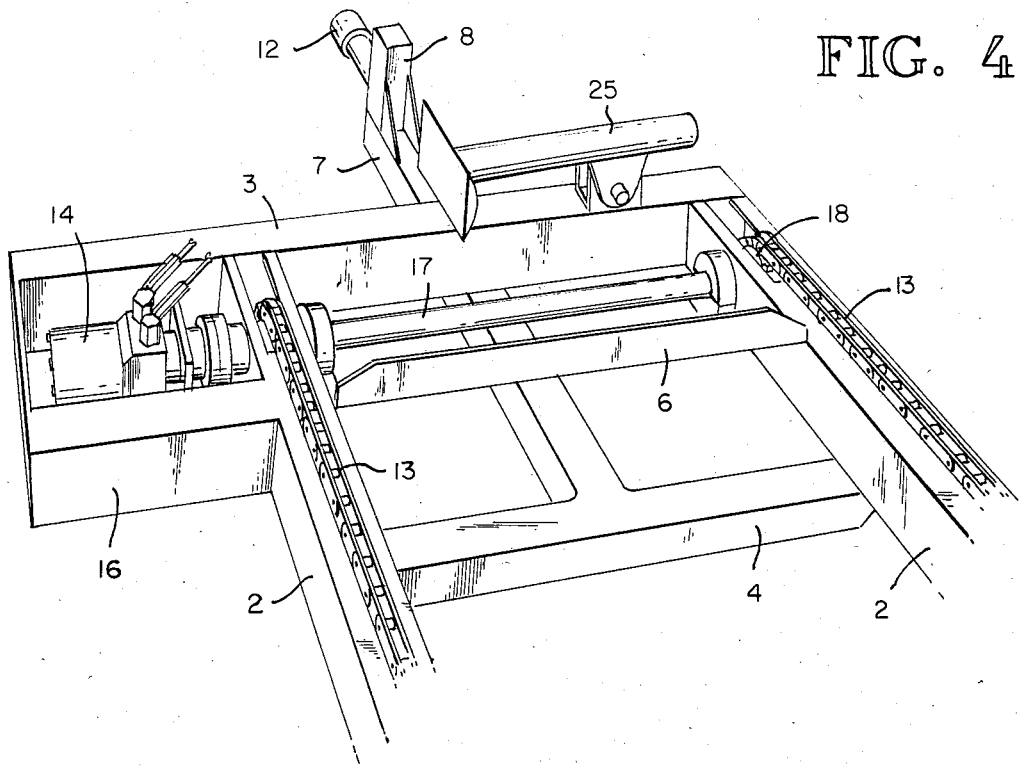
FIG. 4 is a perspective view showing the detail of the forward end of the FIG. 1 embodiment.

Referring first to FIGS. 1 through 4, a trailer 1 according to a preferred embodiment of the present invention includes a bed formed of a pair of generally parallel rails 2 which may be spaced approximately three feet apart and having their forward ends joined by a front crossbar 3 to form a load support. Two or more additional crossbars 4 are preferably welded between the rails 2 at suitable locations along their lengths for structural support. The length of the rails 2 can be varied as desired, with 18½ feet being a sufficient length for carrying four typical fruit bins 5 in the manner shown in FIGS. 2, 3 and 8. As shown in FIG. 4, a length of angle iron, mounted transverse to the rails 2 near their forward ends, forms a stop 6 which prevents bins from sliding off the forward end of the trailer. Alternatively, two vertical standards, extending up from the front end of each rail 2 and joined at their tops by a crosspiece, can be used as a forward stop.

Figure 5:
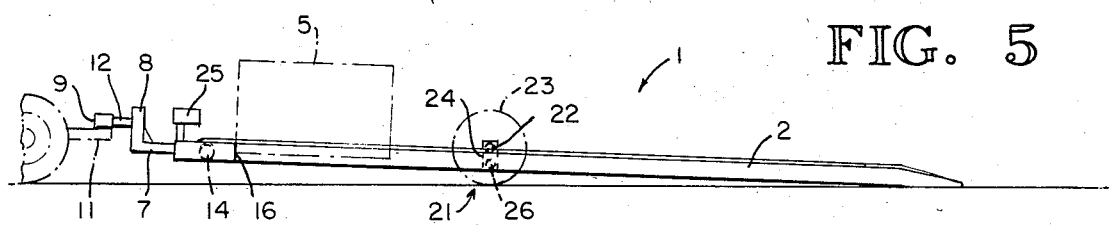
FIG. 5 is a schematic view of the FIG. 1 embodiment in the partially loaded lowered position.
Figure 6:
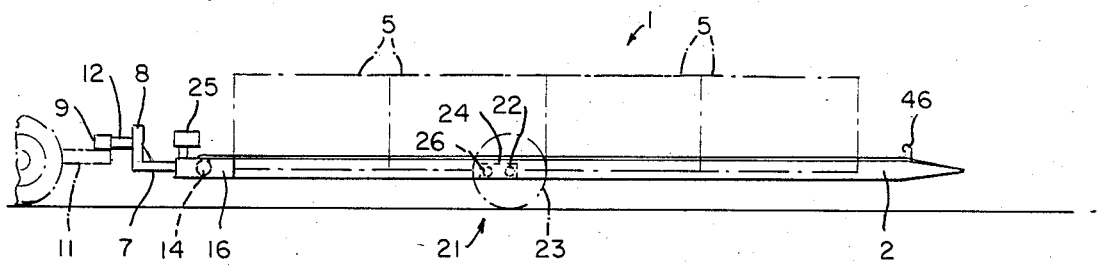
FIG. 6 is a schematic view of the FIG. 1 embodiment in the fully loaded raised position.

A trailer tongue 7, normally about three feet in length, extends forwardly from the center of a crossbar 4 near the forward end of the rails 2. A first vertical upright 8 is affixed to the end of the tongue 7, and a second upright 9 is attached to a conventional hitch 11 on a tractor, as shown in FIGS. 5 and 6. Joining the two uprights 8 and 9 is a generally horizontal coupling 12 which is fixedly attached to the first upright 8 on the tongue 7, and pivotally attached to the second upright 9. The pivoting movement of the coupling 12 allows the trailer 1 sufficient freedom of movement to be pivoted up and down, as indicated by the arrows in FIGS. 2 and 3, in a manner described below.

Referring to FIG. 4, a pair of endless conveyor chains 13 running the length of each rail 2 on its top surface are driven by a reversible hydraulic motor 14. The motor 14 may be driven by the tractor hydraulic system in a conventional manner and is protected by a surrounding frame 16 extending outwardly from the side of one rail 2 adjacent its forward end. The motor 14 rotates a drive shaft 17 which extends between the forward ends of the rails 2. The chains 13 are trained over the sprockets 18 on the shaft 17 and extend along the rails 2. The moving chains 13 assist in pulling a load onto or off of the rails.

A rotatable axle assembly 21, illustrated in FIGS. 1 and 5 through 8, is located near the midpoint of the rails 2. This assembly includes a stub axle or trunion 22 on the outside of each rail 2 for mounting the wheels 23. The inner end of each stub axle 22 is coupled by a radial arm 24 to the cross shaft 26 of the axle assembly, which is offset from the aligned axes of the wheel trunions 22. The shaft 26 extends between the rails 2, and is rotatably mounted thereby. When the wheels 23 are stationary on the ground, rotation of the cross shaft 26 will result in its moving in an arc-shaped path toward or away from ground level because of the offset relationship between the cross shaft 26 and the centers of wheels 23. This movement will raise or lower the rails 2 to elevate or tilt the trailer.

Rotation of the cross shaft 26 is accomplished by the provision of a hydraulically actuated cam plate assembly 27 on each end of the cross shaft 26, as illustrated in FIGS. 7 and 8. Since the cam plate assemblies 27 on each side of the trailer 1 are identical, they will be described with reference to one side only for purposes of clarity. Each cam plate assembly 27 includes a radially extending cam plate 28 fixed to the cross shaft 26 near the inside surface of the rail 2. The cam plate 28 is pivotally connected for actuation to a piston rod 33 extending from a hydraulic cylinder 34. The end of the piston rod 33 is mounted between the cam plate 28 and a radial arm 29 affixed on the cross shaft 26. The opposite end of the hydraulic cylinder 34, which is powered by the hydraulic system of the tractor, is pivotally mounted to a bracket 36 on the rail 2. The hydraulic cylinder 34 is preferably generally parallel to the rail 2 and forward of the wheel 23.

As the piston rod 33 is extended outward from the cylinder 34, as illustrated in FIG. 8, the cam plate 28 and the cross shaft 26 are rotated in a clockwise direction as viewed in FIG. 7 so as to move the cam plate forward and upward relative to the wheels 23. The rails 2 are thus elevated to a position parallel to ground level as shown in FIG. 6. When the piston rod 33 is retracted as shown in FIG. 7, the cam plate 28 is reversibly rotated to lower the cross shaft 26 and the rear ends of rails 2 toward the ground as shown in FIG. 5. When the rearward ends of the rails are thus lowered to the ground, a chuck 25 which can be carried on the front of the trailer 1 as shown in FIGS. 1 and 4 may be inserted under the forward end of the trailer to avoid excessive wear on the cam plate assemblies 27 and hitch 11 during trailer loading.

Each cam plate assembly 27 also operates an automatically locking stop block assembly 37 at the rear end of each rail 2. Since the stop block assemblies 37 on both rails 2 are identical, they will both be described with respect to a single side. An L-shaped lever 38 is pivotally attached at its vertex to the inside of a rail 2 in a position where the lower arm 41 of the lever 38 lies in a generally horizontal plane in the path of a cam lobe 43 projecting from the cam plate 28. The outer end of the upper arm 42 of lever 38 is pivoted to a coupling rod 44 which extends generally parallel to the rail 2 to an elongated stop block 46 pivoted at one end to the inside of the rail 2 in close proximity to the rear end thereof. The coupling rod 44 is pivotally attached to the stop block 46, so that when the lower arm 41 of the lever 38 is actuated downwardly by the cam lobe 43, the stop block 46 is caused to pivot upwardly to the load restraining position shown in FIG. 8. A return spring 47 attached between the upper arm 42 of the lever 38 and a point on the rail 2 biases the lever 38 toward the release position shown in FIG. 7. The stop block 46 is thus pivoted back and down, so as to automatically release when the trailer is lowered. An angle iron 48 and block 49 may be welded to the rail 2 to limit the rearward and forward motion of the stop block 46, respectively.

As illustrated in FIGS. 7 and 8, the stop block 46 is automatically raised as the trailer 1 is elevated, since both movements are caused by the same motion of the cam plate 28. As long as the piston rod 33 is fully extended the block 46 will be maintained upright because of the downward pressure of the cam plate 28 on the lever 38. The block 46 is thus positively locked in position as long as the trailer 1 is raised. The lowering of the trailer 1 is commenced when the cam plate 28 rotates counter clockwise and moves slightly upward. At this point, the lever 38 is released. Thus, the block 46 will be lowered before the trailer 1 is fully lowered, and will be fully raised at the moment the trailer 1 is fully raised. This minimizes interference between the block 46 and bins 5, for efficient loading and unloading.

In operation, when the user wishes to load the trailer 1, he actuates the hydraulic cylinders 34 to lower the cross shaft 26 and rails 2 toward the ground. This causes the rear ends of the rails 2 to contact the ground as shown in FIGS. 2 and 5, and also releases the blocks 46, which are spring-biased toward the lowered or release position. The user then starts the hydraulic motor 14, to operate the conveyor chains 13 in a forward direction to assist in pushing bins 5 forwardly along the rails 2. The user may support the forward end of the trailer 1 with the chuck 25 as the bins are loaded on. When the trailer is loaded, the user stops the hydraulic motor 14 and extends the piston rod 33 as shown in FIG. 8. This brings the rails 2 to a position where they are parallel with ground level as shown in FIGS. 3 and 6, and simultaneously raises the blocks 46 and locks them in the raised position. The user can then transport the trailer 1 as desired, with the bins 5 secured between the forward stop 6 and the automatically raised and locked stop blocks 46 on the rear end of the trailer. To unload the trailer, the user reverses the above procedure, and operates the hydraulic motor 14 in the reverse direction so that the conveyor chains 13 push the bins 5 down the rails 2.

While the invention has been described with respect to a preferred embodiment and a particular use, this has been done for illustrative purposes only and is not intended to limit the scope of the invention.

What is claimed is:

1. A load hauling apparatus comprising:
   a load support bed connected at one end to a first ground support means:
   second ground support means for raising and lowering the other end of said bed to move the bed from a generally horizontal raised position to a tilted lowered position including an axle assembly including axle mounted ground wheels and a rotatable cross shaft supporting said bed, the axis of said cross shaft being offset from the wheel axis, whereby rotation of said cross shaft moves said bed between the raised and covered positions:
   load restraining means positioned in proximity to said other end of said bed and movable between a released position below the surface thereof and a load restraining position above the surface of said bed:
   actuator means operatively associated with said second ground support means and connected to move said load restraining means to the load restraining position when the bed is moved to the generally horizontal raised position; and
   cam means on said cross shaft for contacting said actuator means upon rotation thereof in the direction to move the bed to the horizontal raised position so as to move said load restraining means to the load restraining position.

2. The apparatus of claim 1 wherein said load restraining means includes a block mounted to said bed for pivotal movement between said released position and said load restraining position, and said actuator means includes a lever positioned in proximity to said cam means for engagement thereby, and means for coupling said block to said lever for movement therewith.

3. The apparatus of claim 1 wherein said actuator means includes means for locking said load restraining means in said load restraining position until said bed is moved to the tilted lowered position, and means for biasing said load restraining means toward said released position.

4. A load hauling trailer comprising:
   a load support bed:
   first ground support means connected to a first end of said bed for supporting said first and above ground level;
   second ground support means for raising and lowering the second end of said bed to move said bed between a generally horizontal raised position where said bed is generally parallel to ground level, and a tilted lowered position where the first end of said bed is in close proximity to ground level including an axle assembly including axle mounted ground wheels and a rotatable cross shaft supporting said bed, the axis of said cross shaft being offset from the wheel axles, whereby rotation of said cross shaft moves said bed between the raised and lowered positions;
   a block mounted on said bed for movement between a load restraining position in which it extends above said bed and a released position in which it lies below said bed;
   actuator means operatively associated with said second ground support means and connected to move said block into said load restraining position when said bed is moved into said generally horizontal raised position; and
   cam means on said cross shaft for contacting said actuator means upon rotation thereof in the direction to move the bed to the horizontal raised position so as to move said load restraining means to the load restraini position.

5. The trailer of claim 4 wherein said actuator means includes means to operate said block responsive to the movement of said cross shaft.

6. The trailer of claim 5 wherein said rotating means includes a cam plate affixed to said cross shaft, and hydraulic actuating means connected to rotate said cam plate, whereby said cross shaft is rotated.

7. The trailer of claim 6 wherein said means to operate said block includes:
   lever means positioned in proximity to said cam plate for actuation thereby; and
   a coupling rod extending between said lever means and said block to move said block with said lever means.

8. The trailer of claim 4 further comprising means for biasing said block toward said released position.

* * * * *